United States Patent
Tasharofi et al.

(10) Patent No.: US 11,151,603 B2
(45) Date of Patent: Oct. 19, 2021

(54) OPTIMIZING CONTENT ITEM DELIVERY FOR INSTALLATIONS OF A MOBILE APPLICATION

(71) Applicant: Microsoft Technology Licensing, LLC, Redmond, WA (US)

(72) Inventors: Samira Tasharofi, Cupertino, CA (US); Christopher D. Erbach, Palo Alto, CA (US); Pei Qun Yu, Sunnyvale, CA (US); Nirav Nalinbhai Shingala, Santa Clara, CA (US); Alexandros Ntoulas, Sunnyvale, CA (US); Rohan Rajiv, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 16/237,581

(22) Filed: Dec. 31, 2018

(65) Prior Publication Data
US 2020/0211052 A1    Jul. 2, 2020

(51) Int. Cl.
*G06Q 30/02* (2012.01)
*G06N 20/00* (2019.01)

(52) U.S. Cl.
CPC ......... *G06Q 30/0246* (2013.01); *G06N 20/00* (2019.01); *G06Q 30/0255* (2013.01); *G06Q 30/0267* (2013.01)

(58) Field of Classification Search
CPC ........... G06Q 30/0246; G06Q 30/0255; G06Q 30/0267; G06N 20/00
See application file for complete search history.

(56) References Cited

U.S. PATENT DOCUMENTS

| | | | |
|---|---|---|---|
| 8,818,859 B1 * | 8/2014 | Bouthillier | G06Q 30/0257 705/14.55 |
| 9,560,204 B1 * | 1/2017 | Lindley | H04M 3/42068 |
| 9,785,974 B1 * | 10/2017 | Periasamy | G06Q 30/0267 |
| 10,721,319 B1 * | 7/2020 | Habiger | H04L 67/303 |

(Continued)

OTHER PUBLICATIONS

"Prelaod is the new/old mobile user acquisition? Candy Crush Saga getting preinstalled" (Koetsuerm John, published on Jun. 26, 2014 at VentureBeat.com) (Year: 2014).*

*Primary Examiner* — James M Detweiler
(74) *Attorney, Agent, or Firm* — Nicholson De Vos Webster & Elliott LLP (57) ABSTRACT

Techniques for optimizing content item delivery for installations or activations of a mobile application are provided. In one technique, a machine-learned model is trained based on multiple training instances that individually indicate whether an entity performed a particular action relative to a mobile application. In response to receiving a content item request from a third-party content delivery exchange, it is determined whether a client device that initiated the content item request has activated a particular application. In response to determining that the client device has not activated the particular application, multiple feature values of the content item request are identified. Based on inputting the feature values into the model, a score is generated that indicates a likelihood that an entity of the client device will perform the particular action relative to the particular application. Based on the score, a content item is transmitted over a network to the client device.

18 Claims, 4 Drawing Sheets

(56) References Cited

U.S. PATENT DOCUMENTS

| | | | |
|---|---|---|---|
| 2005/0081053 A1* | 4/2005 | Aston | G06F 21/564 726/24 |
| 2007/0112840 A1* | 5/2007 | Carson | G06Q 30/02 |
| 2007/0186165 A1* | 8/2007 | Maislos | G06Q 30/02 715/728 |
| 2008/0015874 A1* | 1/2008 | Dolle | G06Q 50/16 705/313 |
| 2008/0052278 A1* | 2/2008 | Zlotin | G06Q 30/02 |
| 2011/0071915 A1* | 3/2011 | Lee | G06Q 30/0601 705/26.1 |
| 2011/0086647 A1* | 4/2011 | Riddle | H04W 4/12 455/466 |
| 2012/0091202 A1* | 4/2012 | Cohen | G06Q 20/401 235/382 |
| 2013/0159103 A1* | 6/2013 | Foroughi | G06Q 30/0269 705/14.53 |
| 2013/0262317 A1* | 10/2013 | Collinge | G06Q 20/3823 705/71 |
| 2014/0147048 A1* | 5/2014 | Yang | G06F 16/353 382/190 |
| 2014/0365317 A1* | 12/2014 | Goel | G06Q 30/0273 705/14.71 |
| 2014/0372415 A1* | 12/2014 | Fernandez-Ruiz | G06F 16/9038 707/722 |
| 2015/0161662 A1* | 6/2015 | Minor | G06Q 30/0275 705/14.48 |
| 2015/0304375 A1* | 10/2015 | Dhillon | H04L 65/4007 370/259 |
| 2016/0104209 A1* | 4/2016 | Rebierre | G06Q 30/0269 705/14.71 |
| 2016/0132931 A1* | 5/2016 | Levinson | G06Q 30/0277 705/14.45 |
| 2016/0140670 A1* | 5/2016 | Gupta | G06Q 50/01 705/7.29 |
| 2016/0173700 A1* | 6/2016 | O'Connor | H04M 15/60 455/405 |
| 2017/0068408 A1* | 3/2017 | Gauci | G06F 3/04842 |
| 2017/0192810 A1* | 7/2017 | Lukacs | G06F 11/3093 |
| 2017/0308365 A1* | 10/2017 | Cermak | H04W 4/80 |
| 2017/0372375 A1* | 12/2017 | Wi | G06Q 30/0269 |
| 2018/0063276 A1* | 3/2018 | Foged | H04W 4/80 |
| 2019/0087691 A1* | 3/2019 | Jelveh | G06K 9/6254 |
| 2020/0099789 A1* | 3/2020 | Miller | H04L 65/1046 |

* cited by examiner

OPTIMIZING CONTENT ITEM DELIVERY FOR INSTALLATIONS OF A MOBILE APPLICATION

TECHNICAL FIELD

The present disclosure relates to application installations and, more particularly, to optimizing electronic content delivery for installations of one or more mobile applications.

BACKGROUND

Many publisher systems that publish content through web applications and mobile application rely on content delivery exchange systems to deliver additional content to computing devices that request content from the respective publisher systems. For each request for additional content, a content delivery exchange system might in turn inform, in real-time, multiple content providers about the opportunity to present content from those content providers. Some content providers may be exchange systems themselves, determining which content item of multiple candidate content items to select in response to a request from the "originating" content delivery exchange system. Such a "downstream" exchange system may be restricted on considering requests from whom the identity of the end-user is unknown. For example, some content providers might only want to provide content to end-users for whom complete profile information is available in order to make intelligent targeting decisions. Without detailed information about an end-user, many content providers (and, thus, downstream content exchanges) may pass on the opportunity to present additional content.

However, for some downstream exchange systems, the number or percentage of requests for additional content that are dropped or not considered can be significant, such as 95% of all requests from an originating content delivery exchange system. Thus, there is significant opportunity to present additional content that might still be relevant to end-users for whom relevant content can be alternatively selected.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for optimizing content item delivery for application installations of one or more mobile applications are provided. In one technique, an installation/activation prediction model is trained to compute a likelihood or probability that a user will install or activate a particular application if the user selects a particular content item. The prediction model is trained based on multiple features, such as whether the particular application is preloaded on the user's device, an identity of a third-party application on which the particular content item will be displayed, one or more categories associated with the third-party application, and a type of network connection. In response to a content request from a third-party exchange and based on multiple attributes of the content requests, the likelihood or probability is computed for the installation/activation campaign relative to a particular user associated with the content request. The computed likelihood or probability is combined with other factors, such as a predicted user selection rate, to generate a score that may be used to rank the installation/activation campaign relative to other content delivery campaigns. A content item of the highest-ranking campaign is selected and provided to the third-party exchange.

Embodiments improve computer-related technology by being able to consider many more end-users relative to other approaches. As noted above, other approaches simply drop requests from end-users whose identities are not known to the exchange system. In described embodiments, not only do end-users not need to be known, such end-users do not need to be on a content platform hosted by the provider of the mobile application in order to be targeted. Further, more application installations will enrich current member mapping data which will result in being able to target more end-users with more relevant content items.

System Overview

Figure 1:
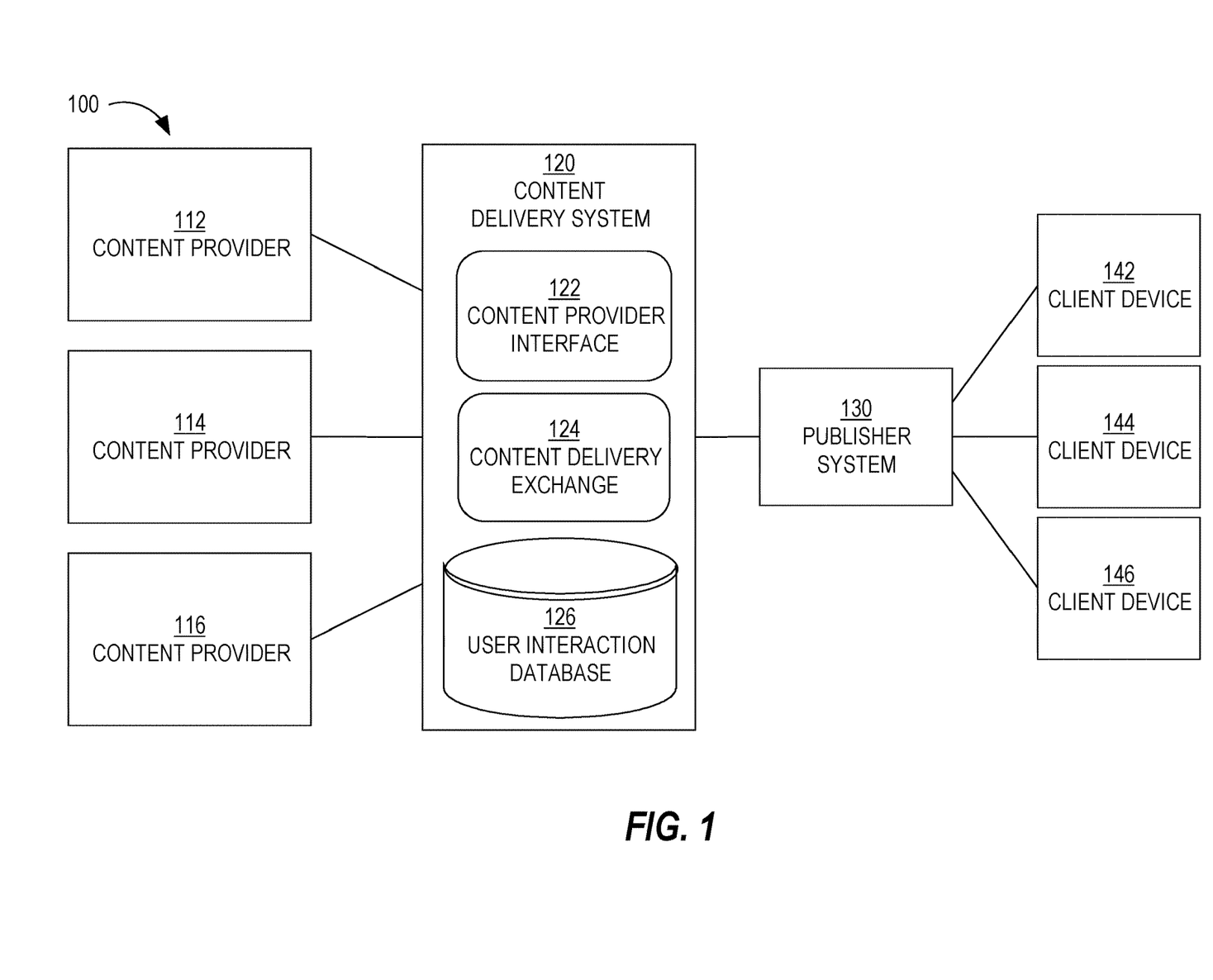
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders, includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may comprise combinations of multiple images, such as a carousel ad. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, install a particular application, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users on one or more publishers. In an embodiment, a content delivery campaign defines who receives a content item and where in the sense that a content item is prevented from being displayed through one publisher application but is allowed to be displayed through another publisher application. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Some member characteristics may be generated using one or more machine learning techniques, in both features (e.g., "standardized" job titles) and in probabilistic (or confidence-based) member mapping from device ID (e.g., LiveRamp). Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per mille (thousand) impressions or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device), and publisher-specific filtering where a publisher can specify that it does not want content pertaining to certain categories displayed in its application and such a filter is honored by filtering those campaigns for that request. In a related embodiment, instead of relying sole on member attributes to identify users to target, activities in common with other user may be taken into account. For example, if user A clicked on the same (or similar) content item as user B who was targeted by campaign C, then user A may be targeted to campaign C, even though user A might not satisfy the targeting criteria of campaign C. Such an "expansion" of targeted users may be managed with a confidence score.

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content items, across client devices 152-156 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a content item that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 126. Logging such events allows content delivery system 120 to track how well different content items and/or campaigns perform.

For example, content delivery system 120 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item, content delivery system 120 may calculate a CTR for the content item.

Another type of event that content delivery system 120 may log is a win event, which is fired when a third-party exchange notifies content delivery system 120 in response to a content item selected by content delivery system 120 having won a content item selection event conducted by the third-party exchange. A win event does not necessarily guarantee that the content item will be presented by a third-party publisher since the third-party publisher might never present the content item.

Optimizing for Application Installations and Activations

One new type of content delivery campaign is an application installation/activation campaign where a goal or purpose of the campaign is for end-users to install a particular mobile application on their respective computing devices or, alternatively, to activate the particular mobile application if the mobile application is already installed on their respective computing devices. The mobile application is configured to communicate with publisher system 130 over a computer network, such as the Internet.

Some computing devices are pre-installed (or preloaded) with the mobile application, for example, by a cellular network provider, by a manufacturer of the computing devices, or by their partners. Thus, for end-users who already have the particular mobile application installed on their respective devices, a goal of the installation/activation campaign is for end-users to activate and use the mobile application. Another goal may be of increase engagement, i.e., to entice users use the mobile application more. Doing so will allow those users to realize the benefits that comes from functionality of the mobile application and increase content item selection event activity on content delivery system 120.

In an embodiment, a content request from a third-party content delivery exchange is processed to determine whether the content request is from a member of a particular online provider. If not, then the end-user associated with the content request is targeted for application installation. If so, the member may still be targeted for application installation if it is known that a computing device associated with the member does not have a particular application installed.

An example of the particular online provider is a social network provider, such as LinkedIn. Examples of a particular application for which installation is sought on end-user devices include LinkedIn Job Search, LinkedIn SlideShare, LinkedIn Learning, LinkedIn Sales Navigator, and LinkedIn Elevate. Examples of third-party content delivery exchanges include MoPub and Rubicon.

Serving Pipeline

Figure 2:
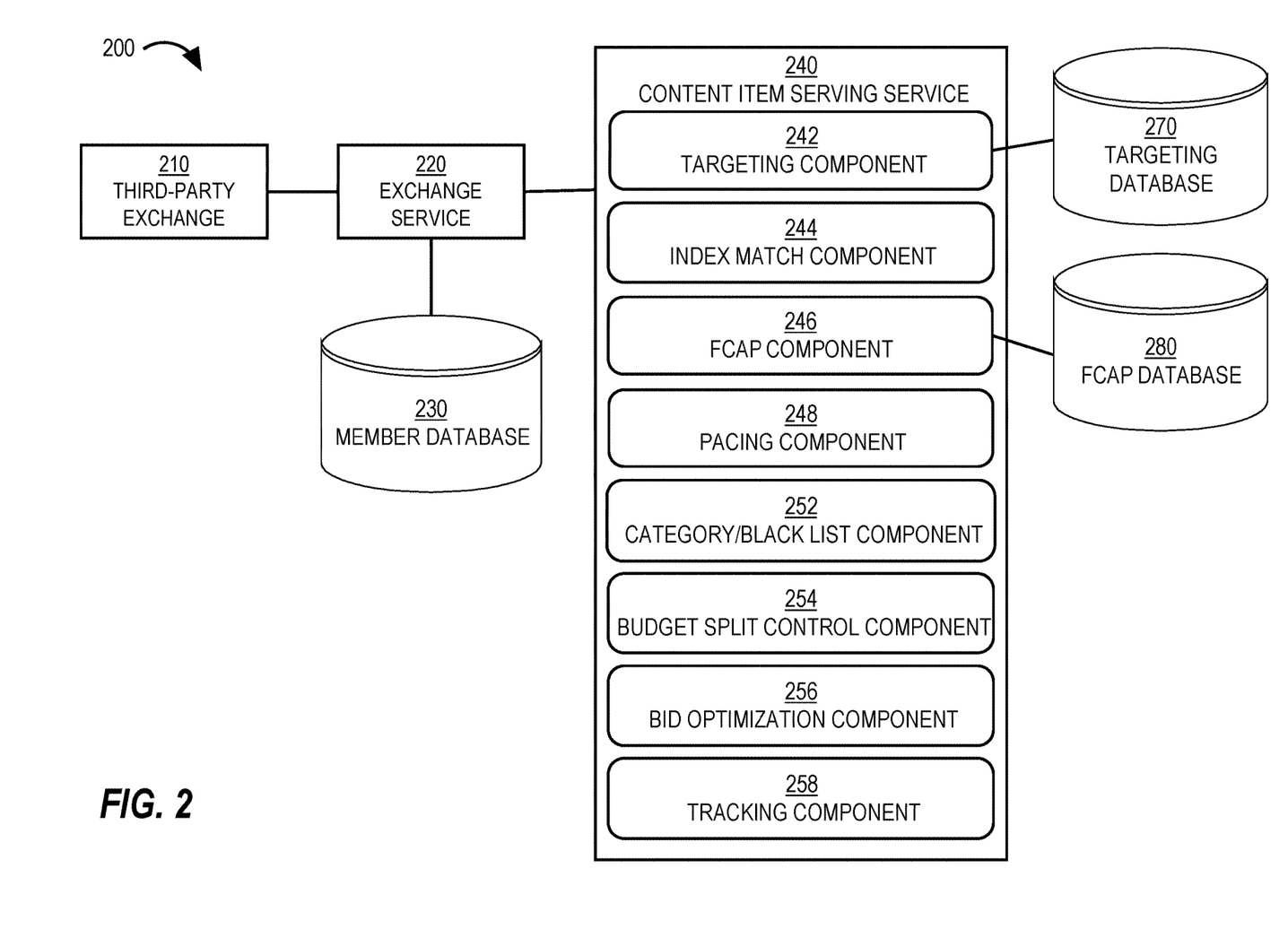
FIG. 2 is a block diagram that depicts an example serving pipeline for serving content items of installation/activation campaigns, in an embodiment.

FIG. 2 is a block diagram that depicts an example serving pipeline 200 for serving content items of installation/activation campaigns that target members and/or non-members, in an embodiment. Content requests initiated by computing devices may come from third-party publisher systems.

Serving pipeline 200 includes a third-party exchange 210, an exchange service 220, a mapping database 230, a content item serving service 240, a targeting database 270, and an FCAP (or "frequency cap") database 280. FCAP database 280 may be a specialization of a tracking database as both have impression data items and click data items. Although only one third-party exchange is depicted, multiple third-party exchanges may be communicatively coupled (e.g., over a computer network, such as the Internet) to exchange service 220. Content delivery system 120 may include exchange service 220, mapping database 230, content item serving service 240, targeting database 270, and FCAP database 280.

A user operating a client device (not depicted) interacts with a third-party publisher application (not depicted). The third-party publisher application displays content requested by the user and also sends a content request to third-party exchange 210. In response, third-party exchange 210 transmits a content request to one or more exchange services, including exchange service 220. The content request from third-party exchange 210 includes a publisher identifier (ID) that uniquely identifies the third-party publisher application. The content request may also include one or more other identifiers, such as a mobile identifier (or MAID), a device ID (e.g., a MAC address), and/or an IP address. The content request may also include a GPS location.

Exchange Service

Exchange service 220 performs one or more operations on the content request, such as a fraud check that determines whether the content request is likely to be fraudulent and, therefore, should be ignored. The fraud check may involve looking up the publisher ID in a list of known fraudulent applications. If the publisher ID is in the list, then the content request is dropped.

Otherwise, exchange service 220 determines whether the content request is associated with a user that is a member of a particular online service, such as a social network service, that might be affiliated with content delivery system 120 or publisher system 130. Such a member determination may be performed by using a request identifier (e.g., MAID, LiveRamp ID, or Microsoft ID) included in the content request to determine whether the request identifier is associated with a member ID. Exchange service 220 accesses a request ID-member ID mapping to make the determination. One or more of such mappings may be stored in mapping database 230.

If the request identifier is associated with a member ID and the member determination came from a particular source (e.g., a MAID-member ID mapping), then the user is a member of the particular online service and the member is associated with a particular mobile application associated with the particular online service. Therefore, the member is not a candidate to be targeted by an installation/activation campaign.

If the request identifier is associated with a member ID and the member determination came from another source, such as a third-party identity resolution platform (e.g., LiveRamp that hosts ID mappings) or a Microsoft data-member ID mapping, then the user is a member of the particular online service and the member is not associated with the particular mobile application associated with the particular online service. (It may instead be the case that the member has the particular mobile application, but has not been active with respect to the particular online service for a certain number of days.) Therefore, the member is a candidate to be targeted by an installation/activation campaign. In an alternative embodiment, only non-members of the particular online service are targeted by installation/activation campaigns.

If the request identifier is not associated with a member ID, then it is presumed that the user is not a member of the particular online service and is not associated with the mobile application and, therefore, is a candidate to be targeted by an installation/activation campaign. In an alternative embodiment, only members of the particular online service are targeted by installation/activation campaigns.

Preloaded Mobile IDs

As described herein, some computing devices are pre-installed (or preloaded) with a mobile application. Thus, for end-users who are not members but who already have the particular mobile application installed on their respective devices, a goal of the installation/activation campaign is for those end-users to activate and use the mobile application.

When a computing device is preloaded with the mobile application, the mobile application will "fire" (or create and send) an event that content delivery system 120 receives and stores. Alternatively, the computing device fires the event. The event includes a certain type of ID (e.g., a mobile advertising ID or MAID) and indicates that the "firing" device is preloaded with the mobile application.

If the user of a content request is not a member (e.g., as determined based on mapping database 230) and the content request from third-party exchange 210 includes a particular type of ID (e.g., a MAID), then exchange service 220 determines whether the ID exists in a particular ID database that stores IDs of the particular type. If so, then that means the mobile application in question is preloaded on the computing device of the user.

The particular ID database may be pre-populated by executing an offline computer job that analyzes certain types of events that are stored in persistent storage, such as a Hadoop Distributed File System (HDFS). The events are installation events that are received when computer devices fire a pre-install event or when a user affirmatively installs the mobile application. Both users with the preloaded mobile application and users that affirmatively installed the mobile application may be targeted by an activation campaign.

In one embodiment, if it is determined that the user is not a member and the computing device (i.e., that initiated the content request) of the user is not preloaded with the mobile application, then the content request is dropped and no longer considered. Thus, no positive response will be returned to third-party exchange 210 in response to the content request from third-party exchange 210.

In another embodiment, even if it is determined that the user is not a member and the computing device of the user is not preloaded with the mobile application, the corresponding content request will still be processed by content item serving service 240. Knowing whether the computing device is preloaded with the mobile application will assist in better bid optimization, as described in more detail below.

In the scenario where the user is not a member and exchange service 220 is configured to target such a user with an installation/activation campaign, the user is assigned a unique ID that acts as a pseudo member ID. An example formula that may be used to generate a pseudo member ID is as follows:

$$\text{Pseudo member ID} = (-1) * \text{hash}(\text{mobile AID of the user's device})$$

Such a generation may be made prior to calling content item serving service 240. With a pseudo member ID, the logic of content item serving service 240 may remain largely the same, with some optional changes. For example, a pseudo member ID uniquely identifies the user and may be used to perform an FCAP check (which applies frequency capping), a fraud check, and bid optimization during the serving pipeline.

Content Item Serving Service

In a scenario where exchange service 220 determines that a content item selection event will be conducted (e.g., no fraud is detected), exchange service 220 calls content item serving service 240 and indicates, in the call, whether the user is a member and, if so, includes the member ID in the call. If the call includes data that indicates whether the user is a member, then it is presumed that both members and non-members are targeted by installation/activation campaigns.

Content item serving service 240 conducts content item selection events. Content item serving service 240 is an example of content delivery exchange 124. In an embodiment, content item serving service 240 includes a targeting component 242, an FCAP component 246, an index match component 244, a pacing component 248, a category/black list component 252, a budget split control component 254, a bid optimization component 256, and a tracking URL component 258 to conduct a content item selection event. Other embodiments may include more or less than these components. For example, the functionality of category/black list component 252, budget split control component 254, and bid optimization component 256 may be excluded from content item serving service 240. Embodiments may include the functionality of these components in a single program or in separate programs.

Targeting component 242 handles standardization of different criterion of a set of targeting criteria of each content delivery campaign. Targeting component 242 performs its functions relative to content delivery campaigns before a content request associated with a user that those campaigns target is processed by content item serving service 240.

Index match component 244 determines which content delivery campaigns a user is eligible to see. The member ID (if one exists) in the call from exchange service 220 is used to identify one or more content delivery campaigns that target (or include) the member ID. If the member ID is not included in the targeting of any content delivery campaign, then processing of the corresponding content request that initiated this content item selection event may end. If there is no member ID in a call from exchange service 220, then index match component 244 may be skipped and, thus, is not invoked. Similarly, FCAP component 246 may be skipped in this no-member-ID scenario. Alternatively, index match component 244 may use a pseudo member ID (if one exists) to perform its regular function, which will result in identifying only installation/activation campaigns. Or, index match component 244 may perform a check to determine whether the member ID is a pseudo member ID (e.g., by checking the sign of the value). After index match component 244 executes, one of the matched content delivery campaigns may be an application installation/activation campaign if (a) the content request was matched to a member ID using a certain source, as described above, indicating that the member does not (or likely does not) have the particular mobile application installed on a computing device of the member or (b) there is no member ID.

FCAP component 246 removes any identified content delivery campaigns whose content items have already been presented to the member (or users with a pseudo member ID) a threshold number of times, referred to as a frequency cap or FCAP. FCAP database 280 may store updated information about which content items or campaigns have been presented to which members over a period of time, such as the last week. FCAP database 280 may be updated regularly as content item impressions are occurring and older impressions are removed or at least not considered based on an associated timestamp. A single FCAP may be applied to all content delivery campaigns hosted by content delivery system 120. For example, no content item of a content delivery campaign may be presented to a member more than three times in five days. Alternatively, different content providers may be associated with different FCAPs. Also, different campaigns may be associated with different FCAPs. Such FCAP "rules" may also be specified in FCAP database 280 or may be specified in a configuration file that is accessible to FCAP component 246.

Pacing component 248 spreads out spending of campaigns over a time period, such as a day. For example, if the remaining budget of a content delivery campaign is below where the budget spend was predicted to be at the current point in the time period, then the content delivery campaign may be filtered so that it is not selected for presentation in a content item selection event conducted by third-party exchange 210. Such filtering or "pacing" is performed to ensure that a campaign's budget is not exhausted too quickly.

Category/black list component 252 determines, for each candidate campaign, one or more categories of the third-party publisher application and determines whether the candidate campaign blacklisted one of those categories or the specific third-party publisher application itself. If so, then the candidate campaign is filtered out. Category/black list component 252 may be part of index matching or may execute afterwards. Example categories are IAB (Interactive Advertising Bureau) categories. There are high-level IAB categories (such as "Arts & Entertainment" and "Careers") and finer granularity IAB categories, such as "Humor," "Music," and "Television" under "Arts & Entertainment" and "College," "Job Fairs," and "Nursing" under "Careers." In a related embodiment, another component filters out content request from certain third-party publisher applications or publisher applications associated with certain categories. Such a component might execute in exchange service 220.

Budget split control component 254 ensures only a certain amount of a campaign's budget is allocated to out-of-network content requests, i.e., that originate from third-party exchanges, such as third-party exchange 210, as opposed to in-network content requests that originate from end-users interacting with publisher system 130 (if the same entity or provider provides both content delivery system 120 and publisher system 130). For example, only X % of a campaign's daily budget may be spent on out-of-network content requests. Thus, if X % or more of a campaign's daily budget is spend on out-of-network content requests, then that campaign is filtered or removed from consideration. However, for application installation/activation campaigns, their whole budget is spent on out-of-network content requests. Thus, budget split control component 254 ignores the budget rule for any application installation campaigns.

Bid optimization component 256 determines an optimal bid for each candidate content delivery campaign. For example, bid optimization component 256 identifies a bid associated with each candidate content delivery campaign and orders the campaigns based on the bid. Additionally or alternatively, for each candidate CPC campaign, in addition to determining a bid associated with the campaign, bid optimization component 256 may determine a predicted user selection rate (e.g., click-through rate or pCTR) for the campaign. Different members and different campaigns may be associated with different pCTRs. Bid optimization component 256 may implement a prediction model that computes a pCTR based on one or more attributes of the member and/or one or more attributes of a candidate campaign. Thus, different users may be associated with different pCTRs with respect to the same candidate campaign and the same user may be associated with different pCTRs with respect to different candidate campaigns. A bid of a campaign (which may be established by a content provider of the campaign) is combined with (e.g., multiplied by) a pCTR associated with the campaign to compute an effective cost per bid or per impression (ECPI). Some content item selection events may include campaigns of different types, such as CPM campaigns and CPC campaigns.

In a related embodiment, if a content delivery campaign comprises multiple content items that are candidates in the same content item selection event, then bid optimization component 256 determines an optimal bid for each candidate content item.

Bid Optimization for Installations/Activations

In an embodiment, bid optimization component 256 implements different logic for installation/activation campaigns than for non-installation/activation (or "traditional") content delivery campaigns. This embodiment may apply only to non-members or to both members and non-members of the online service. Because a goal is to optimize for installation/activations by end-users, statistics related to past installations/activations on computing devices are leveraged to determine an effective cost per impression for one or more installation/activation campaigns. An example formula is:

$$ECPI = CPA * CTR * ATR$$

where CPA is cost per installation/activation (which may be established by the provider of the mobile application and indicates how much the provider is willing to pay for an installation/activation), CTR is click-through rate (which may be a pCTR) which reflects a probability of the user selecting a content item of the campaign after the content item is presented to the user, and ATR is a probability of the user installing/activating the corresponding application after the user selects or clicks on the content item (or simply "activation rate").

A user selection rate prediction model (or a pCTR model) may be used to predict whether a user will select (or click on) a content item of a candidate campaign. The prediction model may be a rules-based model that applies one or more user-specific rules to generate a prediction. Alternatively, the prediction model may be machine-learned model where the weights or coefficients for the different model features are machine-learned. Example machine learning techniques that are used to train a prediction model include supervised learning (e.g., using linear regression, logistic regression, classification algorithms), unsupervised learning (e.g., clustering), gradient boosting, and reinforcement learning. Examples of types of models include support vector machines (SVMs), artificial neural networks, Bayesian networks, and gradient boosting decision trees. If the user is a member, then attributes of the member may be used as input to the prediction model. If the user is not a member, then other attributes of the user and/or the context of the content request are used to calculate a predicted user selection rate (or pCTR).

An activation prediction model may be used to generate an ATR that is specific to the content item selection event and that indicates a probability of the user installing or activating a particular mobile application given that the user clicks on a content item from the corresponding installation/activation campaign. Similar to a pCTR model, an ATR model may be a rules-based model or a machine-learned model where weights or coefficients for different features are learned using one or more machine learning techniques.

In an embodiment, at least two ATR models are generated: one for members and one for non-members. The features for one model may be different than the features for the other model, but there may be overlap in some of the features.

Example features of an ATR model include whether the mobile application in question is already preloaded, an identity of the third-party exchange, an identity of the publisher application (which may be a third-party publisher) that initiated the content request, an identity of one or more (e.g., IAB) categories associated with the publisher application, an identity of the country in which the user currently resides (which may be determined based on an IP address of the user), an identity of a geographic region in which the user currently resides (which may be determined based on an IP address of the user), the type of network connection that the user's computing device is using to access the Internet (e.g., WiFi, 3G, 4G), device model, GPS lat/long, carrier, and the content item format (e.g., height and width dimensions, which may be dictated by the publisher application; different content item formats may be associated with different selection/click rates).

Each feature value (e.g., a particular category or a particular publisher application) is associated with an installation/activation rate. Such rates are computed based on tracking data of previous clicks and installations or activations. For example, each time a user selects a content item that directs the user to download or activate a mobile application, values of attributes related to the content item selection event that resulted in the presentation of the content item are stored in a selection record for that selection event. The selection record indicates whether the mobile application was preloaded, identifies a third-party exchange, identifies a publisher application that initiated the corresponding content request, identifies the user's country, identifies the user's region, identifies the type of network connection, and identifiers one or more categories.

An install or activate record is created each time a user installs a mobile application or activates a preloaded mobile application. Some records may be for installation events and other records for activation events. In an embodiment, optimizations for installations are different than optimizations for activations. For example, different features are considered for an installation prediction model than the features considered for an activation prediction model.

Based on selection records and installation/activation records, multiple installation/activation rates may be calculated. For example, a first activation rate is calculated for users in the United States and a second activation rate is calculated for users in China. As another example, a first installation rate is calculated for 4G connections and a second installation rate is calculated for WiFi connections. Because each record contains multiple feature values, a single selection record and a single installation/activation record may be used to calculate multiple installation/activation rates. The selection records and the installation/activation records may be limited to ones that were created (or are associated with events that occurred) after a particular date, such as the last thirty days.

Once installation/activation rates are calculated for different values of different features, these installation/activation rates are used to calculate predicted installation/activation rates for content requests that trigger subsequent content item selection events. For example, in response to a content request, a feature value for each feature of an installation/activation prediction model is identified based on the current content request (e.g., translating an IP address to a country and/or region, identifying a type of network connection) and each identified feature value is used to lookup a corresponding installation/activation rate in a database of installation/activation rates, each corresponding to a different feature value.

Weights are then applied, respectively, to the identified installation/activation rates. As described previously, the weights may, at least initially, be user-specified weights. Or the identified installation/activation rates are simply averaged, indicated that each feature is weighted equally. Over time, as content delivery system 120 receives more selection events and installation and/or activation events, content delivery system 120 generates training data based on those events and implements one or more machine learning techniques to "learn" the weights for the model features. Machine-learned weights may reveal that certain features (e.g., the type of network connection and publisher application) are much more predictive than other features (e.g., region and IAB category).

With a predicted installation/activation rate (ATR), a predicted user selection rate (or pCTR), and a cost per installation/activation (CPA) determined for an installation/activation campaign, an ECPI of the content item (or the tuple of context, content item, and member profile, if available) is calculated. The installation/activation campaign may be one of multiple candidate campaigns that are being considered for the present content item selection event. For example, one or more other campaigns may be traditional content delivery campaigns (e.g., CPM or CPC campaigns) and/or other installation/activation campaigns. If there are traditional content delivery campaigns, then that means the user is a member, but has either not installed the corresponding mobile application or has not activated the mobile application. If there are no other campaigns other than the installation/activation campaign under consideration, then the user might be a non-member whose computing device may or may not be preloaded with the mobile application. Alternatively, the user might be a member, but is not targeted by any other content delivery campaign.

If there are multiple candidate campaigns, then the candidate campaign with the highest EPCI is selected. That campaign may be a CPM campaign, a CPC campaign, a CPL (cost per lead) campaign, or a CPA (cost per installation/activation) campaign. The highest EPCI value acts as a bid amount that is transmitted to third-party exchange 210 along with content item data that comprises the content item of the selected campaign or that references (e.g., using one or more tracking URLs) where the content item is stored. If third-party exchange 210 selects the bid amount from content delivery system 120, then third-party exchange 210 transmits the content item data to the publisher application. If the content item data includes references, then, when the publisher application or the client device processes the references, the content item is retrieved over a network from content item storage, which may be local or remote relative to content delivery system 120.

Tracking URL

Tracking URL component 258 generates a click tracking URL, an example of which is as follows:
https://rtb-us-east.linkedin.com/lax/clk?trk=TRK&lax-bid=LAX_BID&eid=E_ID&emadid=EMAD_ID& lax- erid=LAXE_RID&adfmt=AD_FMT&aui=AUI& abi=&wp=WP&url=URL&urlhash=URLHASH; client=IP_ID where TRK, LAX_BID, E_ID, EMAD_ID, LAXE_RID, AD_FMT, AUI, WP, URL, URLHASH, IP_ID are macros that are populated at serving time with real values. TRK is an encrypted tracking URL that is internal to exchange service 220 and contains information about the click, the selected campaign, and the selected content item; LAX_BID is a bid value (e.g., 2), E_ID is an ID of third-party exchange 210; EMAD_ID is an encrypted Mobile Advertising ID (MAID) (and may be many characters long); LAXE_RID is a request ID of the request from third-party exchange 210; AD_FMT is a format of the content item (and may be reflected with a single digit); AUI is an ID of the content item selection event; WP is the win price of the content item selection event; URL is the landing page URL which is replaced with a third-party tracking service URL, an example of which is below; URLHASH is the hashed version of the TRK URL above (for validating the URL on the exchange service 220 side); and IP_ID is the IP address of the client device.

An example of a tracking URL (that is fired if the user selects the content item) pointing to a third-party tracking service (e.g., Singular), is as follows:
https://c.singular.net/api/v1/ ad?st=25921214056&h=2985a3d4987282b45ff6b0d3-5777fa68982d45e9&idfa=IDFA&aifa=GAID&psid= PUBLISHER_ID &pcid=LI_CAMPAIGN_ID &pcr-id=LI_CREATIVE_ID where IDFA, GAID, PUBLISHER_ID, LI_CAMPAIGN_ID, and LI_CREATIVE_ID are macros that are populated at serving time with real values. Depending on the mobile operating system of the client device, only one of IDFA and GAID will be populated (IDFA for iOS and GAID for Android). PUBLISHER_ID is the publisher application ID which is used to calculate clicks/activations on different apps. The LI_CREATIVE_ID and LI_CAMPAIGN_ID macros are populated with, respectively, the content item ID and the campaign ID in order for content delivery system 120 to obtain statistics of each campaign and content item.

If the user has the mobile application installed already, then selecting the content item with the initial tracking URL will cause the mobile application to open; otherwise, selecting the content item will cause an online mobile application store (such as Apple App Store or Google Play) to open so that the user is one step closer to installing the mobile application. However, before opening the landing application (whether the mobile application or an online mobile application store), there will be calls to exchange service 220 and, optionally, the third-party intelligence platform (e.g., Singular) for tracking the click so that subsequent activations that occur afterwards can be attributed to exchange service 220.

In summary, user selection of a content item pertaining to an installation/activation campaign results in (1) a call from the third-party publisher application to exchange service 220, (2) a redirect call from the third-party publisher appli-cation to the third-party intelligence platform, and either (3) a deep link to the mobile application (if it is already installed on the client device), which causes the mobile application to activate (or open on the client device) or (4) a redirect call from the third-party publisher application to the online mobile application store, which causes the online mobile application store to open on the client device.

Process Overview

Figure 3:
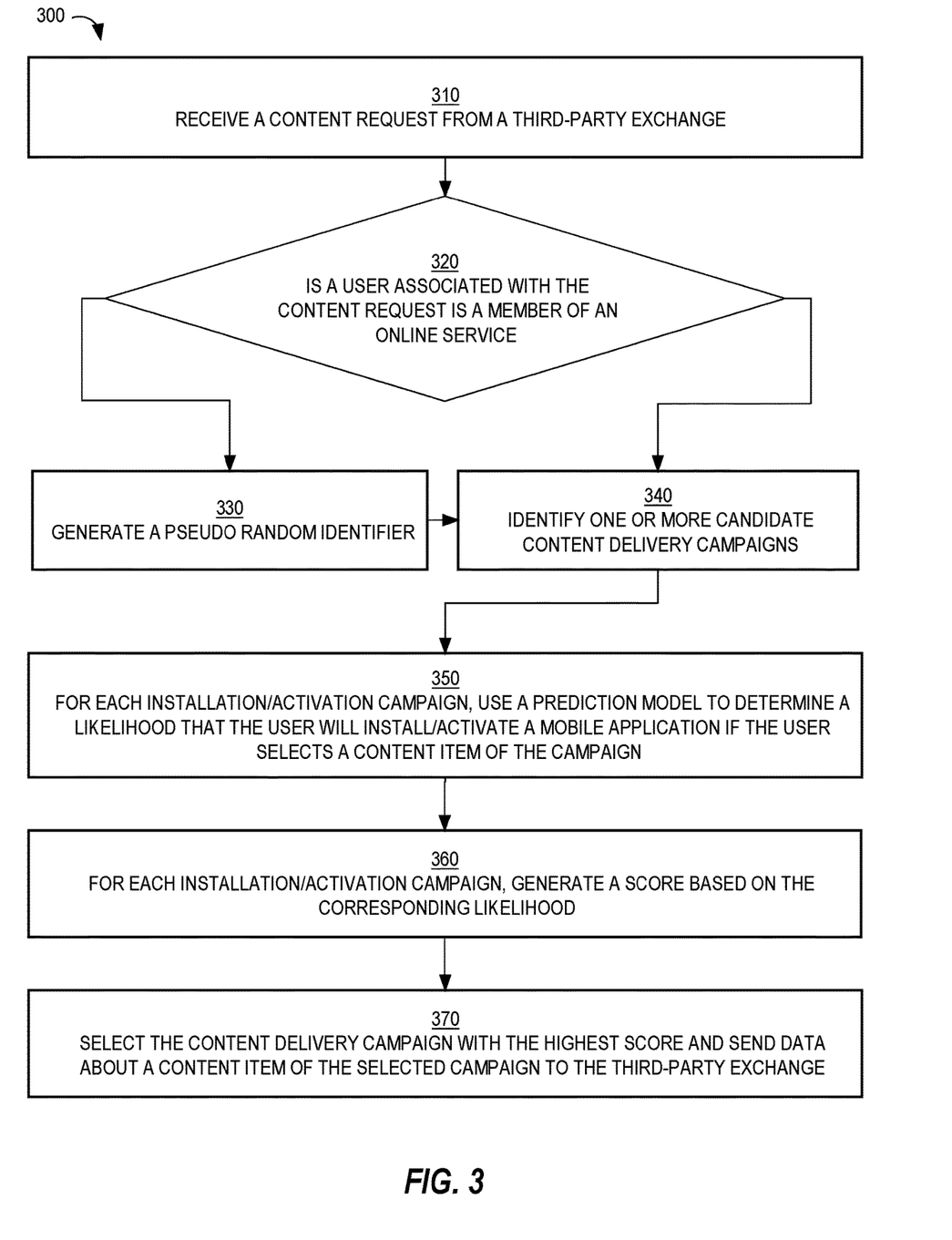
FIG. 3 is a flow diagram that depicts a process for conducting a content item selection event that involves an installation/activation campaign, in an embodiment.

FIG. 3 is a flow diagram that depicts a process 300 for conducting a content item selection event that involves an installation/activation campaign, in an embodiment. Process 300 may be implemented by content delivery system 120 or by different components in FIG. 2.

At block 310, an exchange service (e.g., exchange service 220) receives a particular content request from a third-party exchange (e.g., third-party exchange 210). The particular content request is triggered by an initial content request from a publisher application that executes on a client device and that transmits the initial content request over a computer network to the third-party exchange. The third-party exchange may send the particular content request to multiple "downstream" exchange services, such as exchange service 220. The particular content request may be an HTTP request whose source address is that of the third-party exchange and includes information about the particular content request, such as an identity of the publisher application, an IP address of the client device, a type of network connection, content item format specifications and/or placement, and one or more IAB categories.

At block 320, the exchange service determines whether a user associated with the client device is a member of an online service (such as a social networking service). Block 320 may involve identifying a particular ID (e.g., a MAID) in the particular content request and determining whether the particular ID is associated with a member ID in a member database. If not, then the particular content request may be dropped. In this embodiment, only members are targeted with content items from content delivery campaigns. In an alternative embodiment, the member status of the user (member or not) is irrelevant; however, the member status may be used to determine which content delivery campaign to select.

Optionally, at block 330, the exchange service generates a pseudo member ID if the user is not a member of the online service.

At block 340, one or more content delivery campaigns are identified in response to the particular request. Block 340 may first involve exchange service 220 calling content item serving service 240 with data about the particular content request, such as a member ID or pseudo member ID. Block 340 may involve using the member ID (if one exists) to identify one or more campaigns that are associated with the member ID. If it was determined that the member does not have a particular mobile application installed or activated, then the one or more content delivery campaigns includes an installation/activation campaign. Alternatively, if the user is not a member, then the identified one or more campaigns are installation/activation campaigns. In this example, at least one of the identified campaigns is an installation/activation campaign.

At block 350, for each installation/activation campaign, a prediction model is used to determine a likelihood that the user will install or activate the corresponding application on the user's client device if the user views or selects a content item of the installation/activation campaign. In a related embodiment, the prediction model is used to determine a likelihood that the user will install or activate the corresponding application on the user's client device if the content item results in an impression or if the selected content item wins the content item selection event conducted by the third-party exchange. Block 350 may involve identifying features values of the content request and inputting the identified feature values into the prediction model, which generates the likelihood.

At block 360, a score is generated for each installation/ activation campaign based on the likelihood determined in block 350. Block 360 may be an ECPI value, which is computed based on not only the score, a predicted user selection rate for the corresponding content item, and a cost per installation/activation for the campaign, depending on the type of campaign. For other types of campaigns that are not installation/activation campaigns, such as a CPC campaign, a predicted user selection rate is multiplied by a bid associated with the campaign. For CPM campaigns, only the bid is determined.

At block 370, the content delivery campaign with the highest score is selected and data about a content item of the selected campaign (e.g., ECPI value or bid) is sent to the third-party exchange. Block 370 may involve determining whether the selected content item has an ECPI value that is above a minimum threshold. If there is only one candidate campaign (e.g., an installation/activation campaign) in the content item selection event, then no ranking or selecting from among campaigns is required. If there are multiple candidate campaigns, then the selected campaign may be a CPA, campaign, a CPC campaign, or a CPM campaign.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
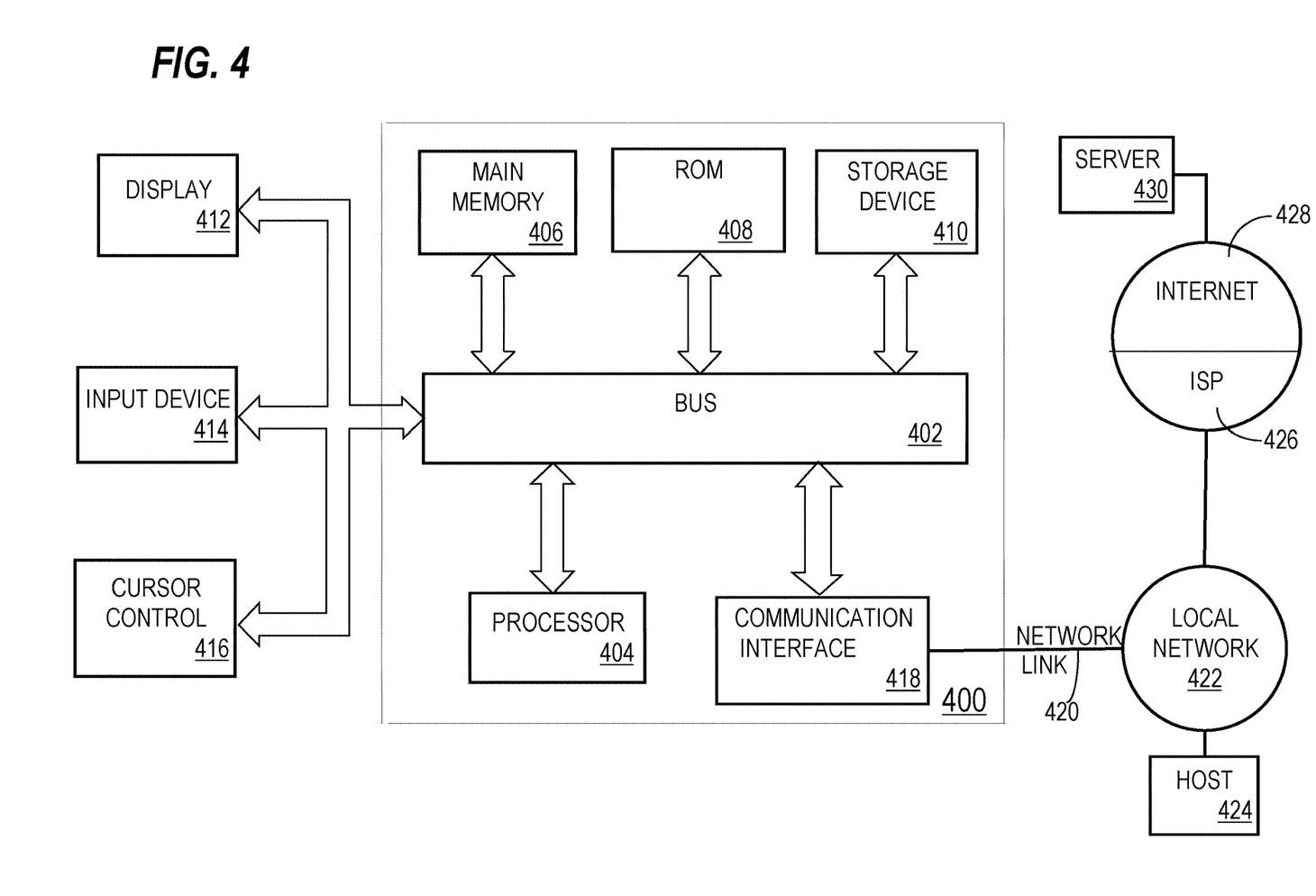
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    training a machine-learned model based on a plurality of training instances that include a first training instance that indicates a first plurality of feature values and an indication that a first entity performed a particular action relative to a mobile application and a second training instance that indicates a second plurality of feature values and an indication that a second entity did not perform the particular action relative to the mobile application;
    wherein a particular feature of the machine-learned model is whether the mobile application is preloaded on a computing device;
    receiving, over a computer network, from a third-party content delivery exchange, a content item request;
    in response to receiving the content item request:
        determining, by a content delivery system in real-time, that a particular application is preloaded on a client device that initiated the content item request;
        determining, by the content delivery system in real-time, whether the client device has activated the particular application;
        in response to determining that the client device that initiated the content item request has not activated the particular application, identifying, by the content delivery system in real-time, a plurality of feature values of the content item request, wherein a feature value of the plurality of feature values indicates that the particular application is preloaded on the client device;
        generating, by the content delivery system in real-time, based on the plurality of feature values and the machine-learned model, a score indicating a likelihood that an entity of the client device will perform the particular action relative to the particular application;
        based on the score, transmitting a particular content item over the computer network to the third-party content delivery exchange, wherein the particular content item includes a tracking uniform resource locator (URL) that, if selected, causes the particular application to be activated on the client device;
    wherein the method is performed by one or more computing devices.

2. The method of claim 1, wherein the particular action is activating the particular application.

3. The method of claim 1, wherein a plurality of features of the machine-learned model include two or more of:
    an identity of the third-party content delivery exchange,
    an identity of a third-party publisher application that communicated with the third-party content delivery exchange and that initiated the content item request,
    a category associated with the third-party publisher application, or
    a type of network connection associated with the computing device.

4. The method of claim 1,
    wherein an application is preloaded on the computing device if a cellular network provider, a manufacturer of the computing device, or a partner of the cellular network provider or the manufacturer preloaded the application.

5. The method of claim 1, wherein the score is a first score, the plurality of feature values is a third plurality of feature values, and the machine-learned model is a first machine-learned model, the method further comprising:
    generating, based on (a) a second machine-learned model that is different than the first machine-learned model and (b) a fourth plurality of feature values that is different than the third plurality of feature values, a second score that is different than the first score and that indicates a second likelihood that the entity of the client device will select the particular content item;

wherein causing the particular content item to be transmitted over the computer network to the client device is also based on the second score.

6. The method of claim 5, further comprising:
determining a resource reduction amount for the particular content item;
calculating a final score based on the resource reduction amount, the first score, and the second score;
wherein causing the particular content item to be transmitted over the computer network to the client device is also based on the final score.

7. The method of claim 1, further comprising:
based on the tracking URL being selected on multiple client devices, generating selection events, each of which indicates that an instance of the particular content item was selected by a different entity;
generating installation/activation events when the particular application was installed or activated;
based on the selection events and the installation/activation events, calculating an installation/activation rate for each of multiple feature values across multiple entities that selected an instance of the particular content item;
wherein each feature value in the multiple features values is associated with a different installation/activation rate;
wherein the installation/activation rates of the multiple feature values are input to the machine-learned model.

8. One or more storage media storing instructions which, when executed by one or more processors, cause:
training a machine-learned model based on a plurality of training instances that include a first training instance that indicates a first plurality of feature values and an indication that a first entity performed a particular action relative to a mobile application and a second training instance that indicates a second plurality of feature values and an indication that a second entity did not perform the particular action relative to the mobile application;
wherein a particular feature of the machine-learned model is whether the mobile application is preloaded on a computing device;
receiving, over a computer network, from a third-party content delivery exchange, a content item request;
in response to receiving the content item request:
determining, by a content delivery system in real-time, that a particular application is preloaded on a client device that initiated the content item request;
determining, by the content delivery system in real-time, whether the client device has activated the particular application;
in response to determining that the client device that initiated the content item request has not activated the particular application, identifying, by the content delivery system in real-time, a plurality of feature values of the content item request, wherein a feature value of the plurality of feature values indicates that the particular application is preloaded on the client device;
generating, by the content delivery system in real-time, based on the plurality of feature values and the machine-learned model, a score indicating a likelihood that an entity of the client device will perform the particular action relative to the particular application;
based on the score, transmitting a particular content item over the computer network to the third-party content delivery exchange, wherein the particular content item includes a tracking uniform resource locator (URL) that, if selected, causes the particular application to be activated on the client device.

9. The one or more storage media of claim 8, wherein the particular action is activating the particular application.

10. The one or more storage media of claim 8, wherein a plurality of features of the machine-learned model include two or more of:
an identity of the third-party content delivery exchange,
an identity of a third-party publisher application that initiated the content item request,
a category associated with the third-party publisher application, or
a type of network connection associated with the computing device.

11. The one or more storage media of claim 8,
wherein an application is preloaded on the client device if a cellular network provider, a manufacturer of the computing device, or a partner of the cellular network provider or the manufacturer preloaded the application.

12. The one or more storage media of claim 8, wherein the score is a first score, the plurality of feature values is a third plurality of feature values, and the machine-learned model is a first machine-learned model, wherein the instructions, when executed by the one or more processors, further cause:
generating, based on (a) a second machine-learned model that is different than the first machine-learned model and (b) a fourth plurality of feature values that is different than the third plurality of feature values, a second score that is different than the first score and that indicates a second likelihood that the entity of the client device will select the particular content item;
wherein causing the particular content item to be transmitted over the computer network to the client device is also based on the second score.

13. The one or more storage media of claim 12, wherein the instructions, when executed by the one or more processors, further cause:
determining a resource reduction amount for the particular content item;
calculating a final score based on the resource reduction amount, the first score, and the second score;
wherein causing the particular content item to be transmitted over the computer network to the client device is also based on the final score.

14. The one or more storage media of claim 8, wherein the instructions, when executed by the one or more processors, further cause:
based on the tracking URL being selected on multiple client devices, generating selection events, each of which indicates that an instance of the particular content item was selected by a different entity;
generating installation/activation events when the particular application was installed or activated;
based on the selection events and the installation/activation events, calculating an installation/activation rate for each of multiple feature values across multiple entities that selected an instance of the particular content item;
wherein each feature value in the multiple features values is associated with a different installation/activation rate;
wherein the installation/activation rates of the multiple feature values are input to the machine-learned model.

15. A system comprising:
one or more processors;
one or more storage media storing instructions which, when executed by the one or more processors, cause:
training a machine-learned model based on a plurality of training instances that include a first training instance that indicates a first plurality of feature values and an indication that a first entity performed a particular action relative to a mobile application and a second training instance that indicates a second plurality of feature values and an indication that a second entity did not perform the particular action relative to the mobile application;
wherein a particular feature of the machine-learned model is whether the mobile application is preloaded on a computing device;
receiving, over a computer network, from a third-party content delivery exchange, a content item request;
in response to receiving the content item request:
determining, by a content delivery system in real-time, that a particular application is preloaded on a client device that initiated the content item request;
determining, by the content delivery system in real-time, whether the client device has activated the particular application;
in response to determining that the client device that initiated the content item request has not activated the particular application, identifying, by the content delivery system in real-time, a plurality of feature values of the content item request, wherein a feature value of the plurality of feature values indicates that the particular application is pre-loaded on the client device;
generating, by the content delivery system in real-time, based on the plurality of feature values and the machine-learned model, a score indicating a likelihood that an entity of the client device will perform the particular action relative to the particular application;
based on the score, transmitting a particular content item over the computer network to the third-party content delivery exchange, wherein the particular content item includes a tracking uniform resource locator (URL) that, if selected, causes the particular application to be activated on the client device.

16. The system of claim 15, wherein the particular action is activating the particular application.

17. The system of claim 15, wherein a plurality of features of the machine-learned model include two or more of:
an identity of the third-party content delivery exchange,
an identity of a third-party publisher application that initiated the content item request,
a category associated with the third-party publisher application, or
a type of network connection associated with the computing device.

18. The system of claim 15,
wherein an application is preloaded on the client device if a cellular network provider, a manufacturer of the computing device, or a partner of the cellular network provider or the manufacturer preloaded the application.

* * * * *